Dec. 15, 1925. 1,565,355
J. E. FARRELL, JR
FLUID CLUTCH
Filed April 18, 1922 4 Sheets-Sheet 1
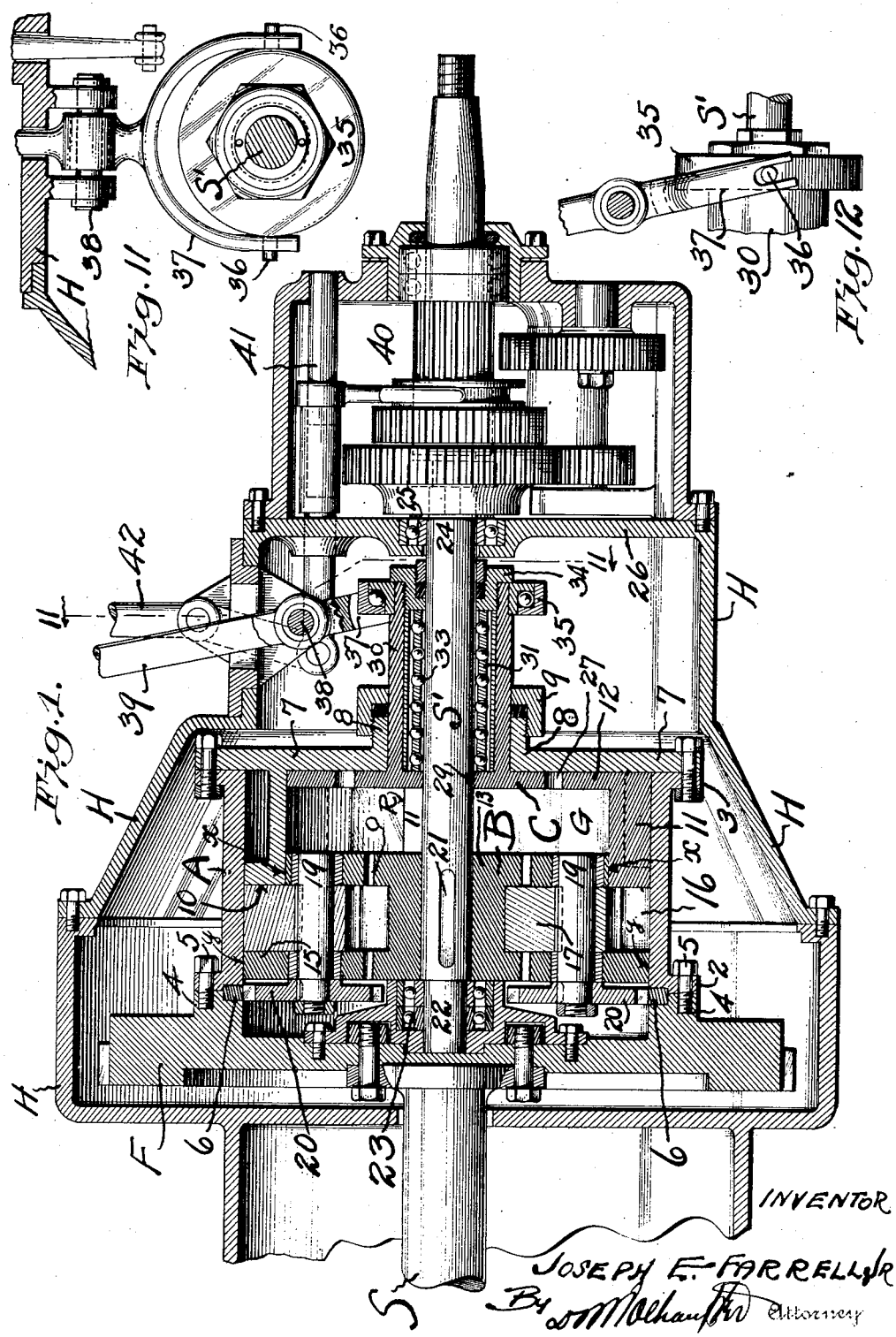
INVENTOR
JOSEPH E. FARRELL JR Dec. 15, 1925.
J. E. FARRELL, JR
1,565,355
FLUID CLUTCH
Filed April 18, 1922    4 Sheets-Sheet 2
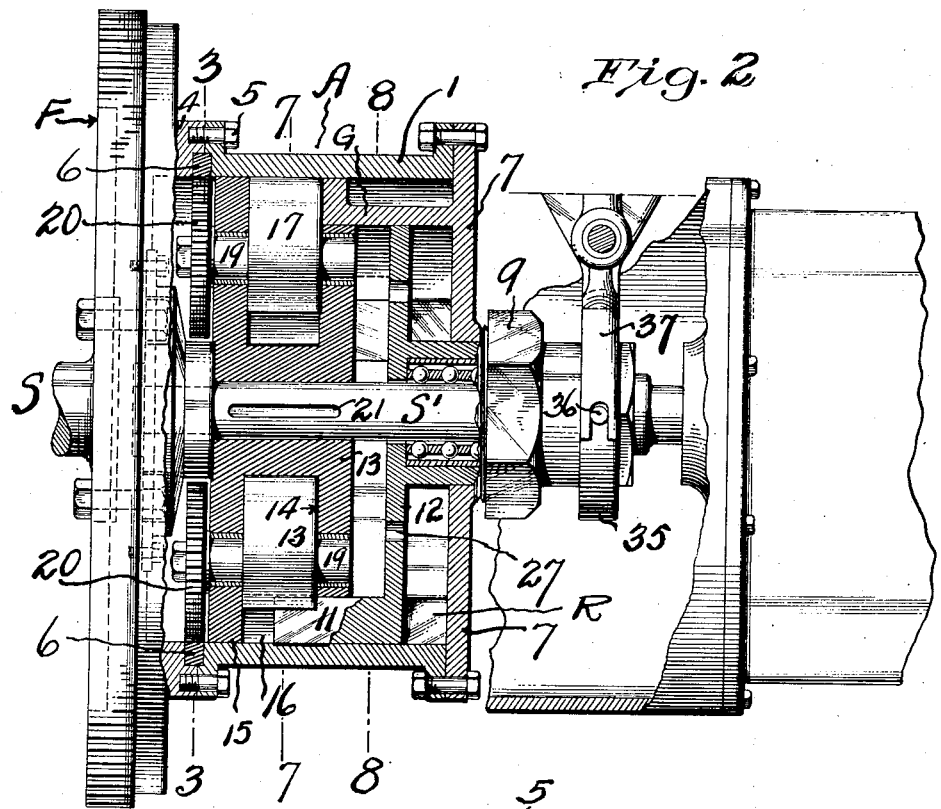
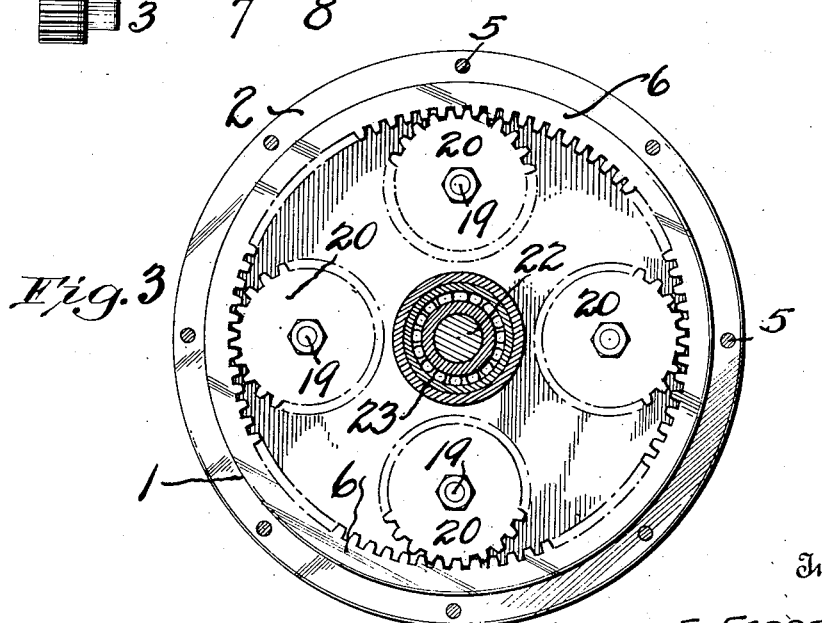
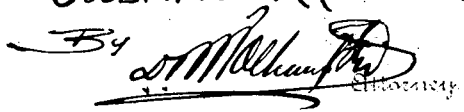

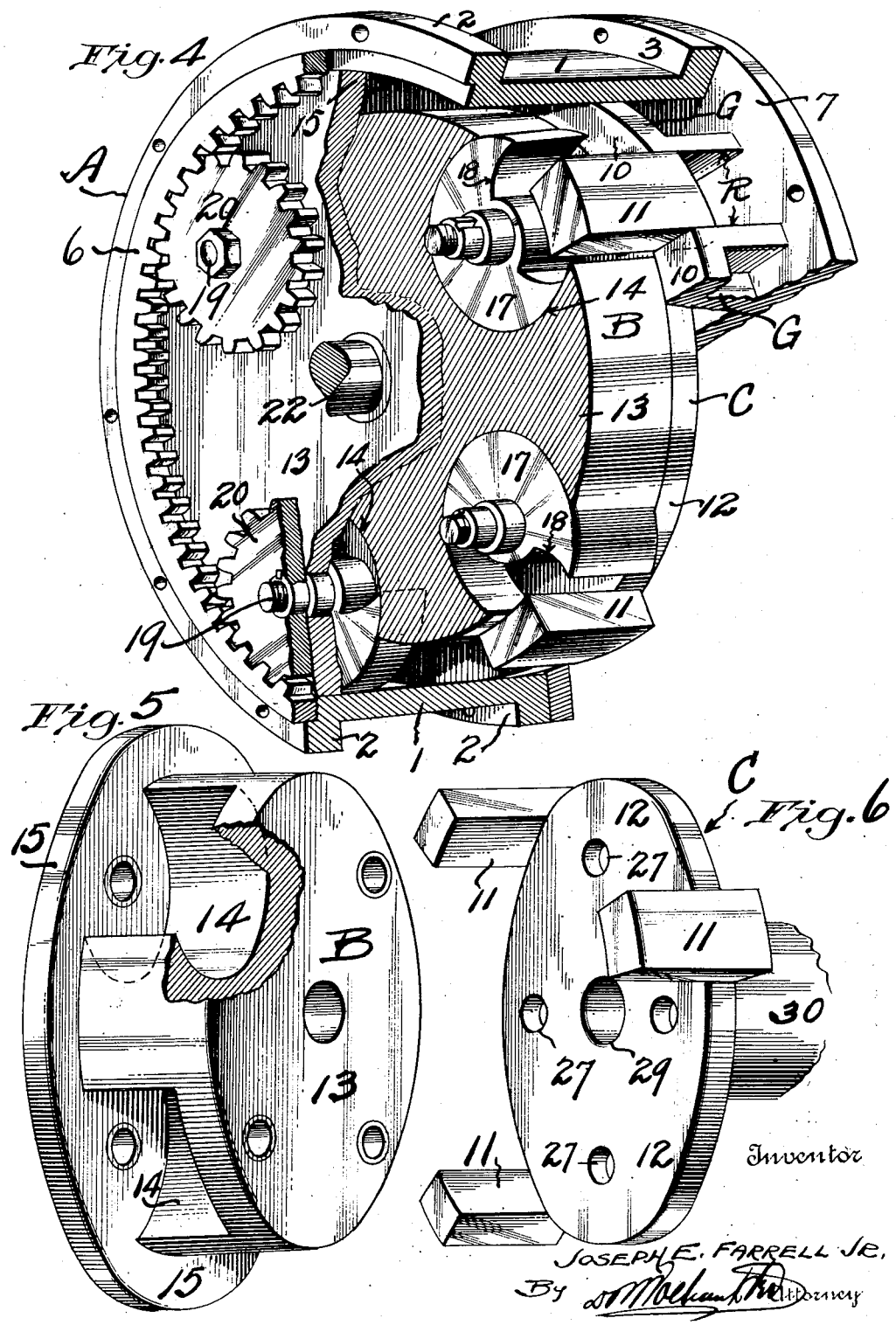

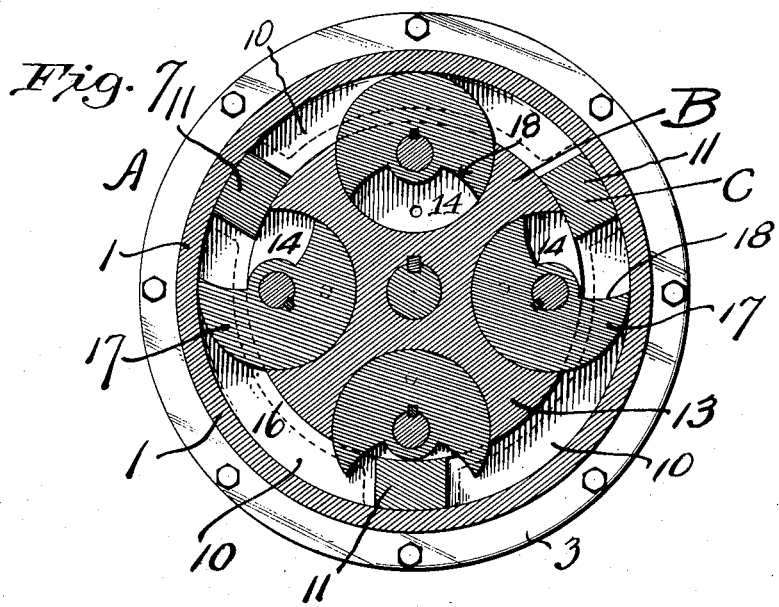
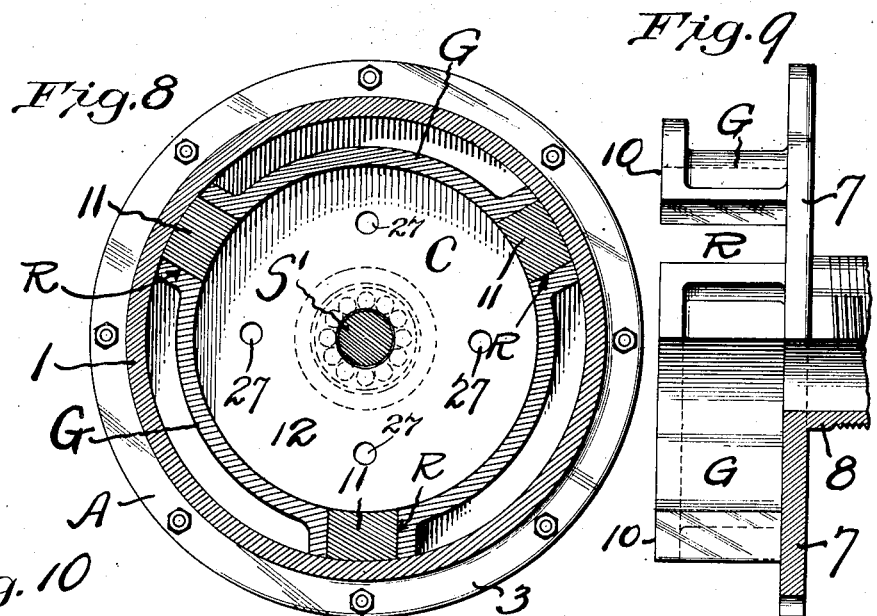
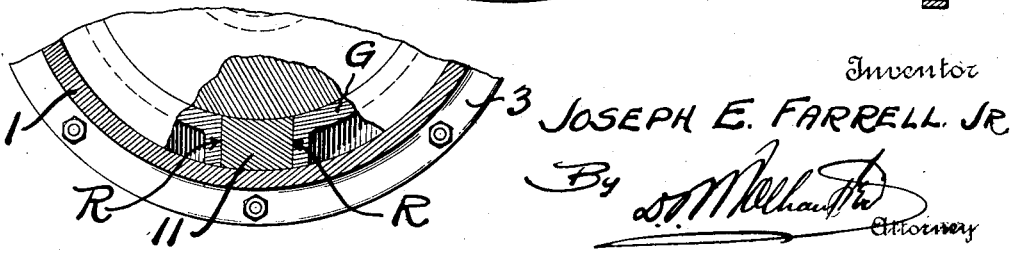

Patented Dec. 15, 1925.

1,565,355

UNITED STATES PATENT OFFICE.

JOSEPH E. FARRELL, JR., OF LANCASTER, PENNSYLVANIA.

FLUID CLUTCH.

Application filed April 18, 1922. Serial No. 555,176.

*To all whom it may concern:*

Be it known that I, JOSEPH E. FARRELL, Jr., a citizen of the United States, residing at Lancaster, in the county of Lancaster and State of Pennsylvania, have invented certain new and useful Improvements in Fluid Clutches, of which the following is a specification.

This invention relates to an improvement in combined transmission and clutch devices of the fluid or hydraulic type intended for connecting an engine, motor, or other power unit with load moving or other work performing instrumentalities.

A primary object of the invention is to provide a simple, practical and reliable construction which is susceptible of a substantial and durable commercial embodiment that will effectively overcome starting inertia and also provide the necessary power range to gradually impose the load on the power without shock or jar.

Another object is to provide a novel engine driven member and propeller member that may be readily coupled and released, wholly or partially, by the manipulation of novel shiftable control means which when withdrawn from the oil channel leaves a relatively free, continuous and unobstructed passage for the oil or other fluid permitting the same to be relatively static or inert thereby avoiding frictional heat and loss of power.

Another object of the invention is to provide a novel arrangement of driving and driven instrumentalities which permit of facile operation and control.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which:—

Figure 1 is a vertical longitudinal sectional view of the improved device.

Figure 2 is a vertical sectional view, somewhat similar to Fig. 1, showing the sliding piston valves moved forward to partially obstruct the out channel.

Figure 3 is a vertical sectional view taken on the line 3—3 of Figure 2.

Figure 4 is an enlarged sectional perspective view showing the relative arrangement and position of the engine driven and propeller members, as well as the sliding valve piston valve device.

Figure 5 is a detail perspective view of the propeller member which carries the rotating abutments.

Figure 6 is a detail perspective view of the sliding piston valve device.

Figure 7 is a vertical cross-sectional view taken on the line 7—7 of Fig. 2.

Figure 8 is a vertical cross-sectional view taken on the line 8—8 of Fig. 2.

Figure 9 is a side elevation of a rear casing plate shown in Fig. 3.

Figure 10 is a detail view, partly in section, showing how the piston valve members seat flushly within the rear casing plate.

Figure 11 is an enlarged detail sectional view taken on the line 11—11 of Fig. 1 showing the clutch yoke connection for operating the sliding piston valve-device.

Figure 12 is a detail view illustrating how the yoke of Fig. 11 connects with the collar on the sliding piston valve-device.

Similar reference characters designate corresponding parts throughout the several figures of the drawings.

In carrying the present invention into effect it is proposed to provide a simple, compact, and well organized device that readily responds to the control of the operator to connect and disconnect the engine, motor or the like with the propeller shaft or other element to be driven.

To that end the invention preferably includes a novel engine driven unit designated generally as A, a propeller unit B, and a sliding control unit C, all arranged within the housing or engine driven or driving unit to provide for adequately retaining the oil or other fluid without leakage or waste and at the same time providing a construction that may be readily assembled or taken apart with a minimum expense of time and labor.

In connection with the engine driven unit

A it will be observed that the same may be associated directly with the fly wheel F of the motor of which the driving shaft S is a part. Also, as will be seen from Figure 1, the entire device may be enclosed and protected by a suitable housing H which may be made in conveniently separated sections and secured together by bolts or other fastenings in the well-known manner to completely conceal and protect the entire device, thereby making it weather and dust proof.

As will be observed from the drawings, the said engine driven unit A preferably includes a ring-like casing member 1 having the opposite flanges 2 and 3, the former being adapted to be secured to the annular rib 4 on the fly wheel by the bolts 5 or the like and, when thus secured in position, serves to hold or clamp a gear ring 6 between the fly wheel and the ring. The rear flange 3 of the casing ring has bolted or otherwise secured thereto a novel rear cover plate 7 having a central boss 8 provided with external threads to receive a gland nut 9. The inner side of the rear cover plate 7 is of special formation and constitutes one of the novel and distinctive features of the present improvement. That is to say, as will be observed from the drawings, the inner side of this plate is provided with a plurality of spaced inwardly extending and preferably hollow guide members G having the end wall portions 10 for engaging with the inside of the casing ring 1. The spaces between the guide members are designated as R and constitute guide recesses or grooves (Figures 8 and 9) for flushly accommodating the vanes or piston members 11 carried by the body 12 of the sliding valve control unit C, as will hereinafter more fully appear.

With the arrangement described, it will be apparent that the driving unit A essentially includes the casing ring 1 adapted to be bolted to the fly wheel F and having the rear cover plate 7 provided with spaced guide members G which cooperate with the sliding control unit C to insure its accurate movement and operation, as will presently appear. Also the casing ring 1 serves to assist in clamping the gear ring 6 in position so that it will move with the fly wheel and with the casing ring. It will therefore be understood that the entire driving unit, as above described, rotates with the fly wheel F.

The propeller unit B is also of novel formation and preferably consists of a body 13 having the peripheral pockets 14 and the flange 15, the said body being of less diameter than the flange and fitting within the guide members G which provide a bearing therefor at $x$. The flange 15 has a diameter equal to the interior of the ring 1 with which it has a bearing engagement as shown in the drawings at $y$. This flange 15 cooperates with the end walls 10 of the guide members G to provide in the space between a relatively free, unobstructed and continuous oil or fluid channel 16 into which the rotary abutments 17 housed within the pockets 14 operate in conjunction with the piston valve members 11 of the control unit C.

The said rotary abutments 17 are of substantially disk-like formation and are cut away as indicated at 18 to clear the vanes or piston members 11 of the control unit when they are projected into the oil channel. In order to properly time the registration of the cut away portions 18 with the piston valve members 11, each abutment is keyed to a spindle 19 journaled in the flange 15 and body 13 of the propeller unit and carrying a gear 20 meshing with the gear ring 6 carried with the fly wheel or engine driven member A.

When the shaft S of the motor is running and the propeller or driven shaft $S^1$ is idle the gear ring 6 will drive the gears 20 thereby causing the rotary abutments to idly rotate in the static column of oil in the channel 16 because when the piston valve members 11 are withdrawn the oil in the channel 16 becomes a static or inert body and is in effect a part of the propeller unit B which is idle. It will therefore be understood that when the vanes or piston members 11 are entirely retracted from the oil channel 16, the rotary abutments 17 and the oil are relatively static or inert permitting the engine member to freely rotate and slip over the abutments and the oil. On the other hand, when the piston members 11 are projected entirely across the oil channel 16 the oil is trapped between the same and the rotary abutments thereby locking the engine member and the propeller member rigidly together. When the piston members 11 are projected entirely across the oil channel 16 the parts of the device are in the high-speed low-power position, but when the said members 11 are only partially projected into the channel as indicated in Fig. 2 relative slippage is provided between the engine member and the propeller member, thereby reducing speed and increasing power in proportion to the area of the piston members 11 presented to the oil in the channel 16.

The propeller shaft S′, is in effect a part of the propeller unit B by reason of its being keyed to the body 13 of the unit as indicated at 21 and for supporting the said shaft, the front end 22 thereof is journaled in a suitable bearing 23 carried by the fly wheel F, while the other end 24 thereof is journaled in the bearing 25 formed in the wall 26 of the housing H.

Referring now more particularly to the sliding control unit C, it will be observed that the body 12 thereof which carries the piston valve members 11 at its periphery slides within the recesses R of the guide projections G and is provided with bleed openings 27 to eliminate resistance to its movement by oil surrounding the propeller unit. The central portion of the body 12 is provided with an opening 29 for receiving the shaft S' and is also provided with a sleeve 30 which bears in the box 8 of the rear cover plate 7 and is of sufficiently large diameter, as compared with the driven shaft S', to provide a chamber 31 for receiving the bearing 32 which may be of the type using the balls 33 held in place by the gland nut 34. The outer side of the sleeve 30 adjacent the gland nut 34 is provided with a floating ring 35 having the offset portions 36 for receiving the clutch yoke 37 which is pivoted, as at 38, in the housing H and is provided with an operating lever or handle 39.

For the purpose of obtaining a reverse drive from the propeller shaft S', a reversing gear unit 40 is carried at one end of the housing H. This reversing unit preferably includes suitable gearing operated by the shifter arm 41 through the reverse lever 42.

From the foregoing it will be apparent that the present device includes the engine driven unit A carried with the fly wheel F and consisting of the casing ring 1 and rear cover plate 7 carrying the guide members G, the said casing ring 1 receiving and housing the propeller unit B consisting of the flanged body 13 which defines the bottom and one side of the oil channel 16 and carries the rotary abutments 17. Within the casing provided by the ring 1 the sliding control unit C operates when acuated through the lever 39.

With the arrangement described it will be seen that the engine driven member or driving unit A carries with it the control unit C in the sense that the same rotates therewith but is entirely free to have a longitudinal sliding movement independent of its rotational movement. Thus, the sliding piston members 11 rotate with the engine driven unit A at all times, and their function as vanes for pressing against the oil in the oil channel 16 varies according to the distance of their projection across the width of the oil channel.

When the vanes or piston members 11 are entirely withdrawn from the oil channel 16 the oil therein becomes relatively static or inert and becomes in effect solely a part of the propeller member B thereby permitting the engine driven member to freely rotate.

When the members 11 are projected entirely across the oil channel the column of oil in the channel is trapped between the piston members 11 and the rotary abutments 17 and then become a part of the engine driven member and cease to rotate and act as fixed blades to carry the full torque load of the engine member.

In other words, as above pointed out, when the vanes or piston members 11 are fully projected across the channel 16 thus fully closing the same, the pressure on the oil column is only equal to the torque load of the engine member, and the speed of the oil column in the channel is equal only to the speed of the drive shaft because the rotatable abutments 17 do not rotate. In this condition they merely act as locking blades of the drive shaft member.

In intermediate speeds, however, the whole relation above described is changed. That is to say, in intermediate speeds when the motor is picking up the load, the pressure of the oil column rises in proportion to the degree of withdrawal of the members 11 from the channel 16 and the speed of the oil column increases because the rotating abutments are brought into play to act as powerful pumps rotating at three times the speed of the engine member due to the 3 to 1 gear ratio between the gear ring 6 and the gears 20, and increasing the pressure of the oil column way beyond the normal or torque load pressure existing when the members 11 are projected fully across the oil channel. This feature of the device in which the members 17 act as pumps for advancing the oil around in the channel 16 when the members 11 are partially projected therein is of considerable importance because it provides for increased power at the expense of speed to carry grade loads. That is to say, the resistance on the oil column in the oil channel 16 rises in proportion to the amount of projection of the piston members 11 into the oil channel to thereby increase the power and speed of the oil column far beyond the normal torque pressure. In that way the device is capable of handling varying grade loads by shifting the control unit C to regulate the projection of the piston valve members 11 into the oil channel 16.

In connection with the displacement of the oil within the oil channel 16 caused by the projection of the piston members 11 therein it is pointed out that there is sufficient leakage between the flange 15 and the interior of the casing 1 at $y$ and also sufficient leakage between the periphery of the body 13 and the inner surface of the guides G at $x$ to permit the volume of oil displaced by the members 11 to move into the chambers provided at each side of the propeller unit B. However, under some circumstances it may be desirable to provide suitable bleed ports $o$ as shown in Figure 1 for permitting the escape of the oil trapped in the pockets 14 when the members 11 are projected into the oil channel.

Assuming that the parts are in the position shown in Fig. 1 of the drawings, the driven shaft S' will be idle even though the driving shaft S is in motion. That is to say, with the parts in the position shown in Fig. 1, the clutch is in a so-called disengaged position due to the fact that the piston valves 11 are withdrawn or retracted entirely clear or free of the oil channel 16. Even if the fly wheel F is rotated with the parts shown, as in Fig. 1, the driven shaft S' will be idle, the rotary abutments 17 simply rotating on their own axes and leaving the oil static or inert. However, when the lever 39 is manipulated so as to move the body 12 of the control unit C inwardly by sliding the sleeve 30 through the gland nut 9 and boss 8, the piston valves 11 are gradually thrust into the oil channel 16, thereby having the effect of pumping the oil faster and also throttling the channel causing the pressure to rise and the driven shaft S' to be gradually driven in proportion to the amount of projection of the piston valves into the oil channel 16. While the sliding pistons are being projected into the oil channel the rotary abutments 17 will avoid the same due to the cut away portions 18 of said pistons being timed to register with the position of the pistons so that as the same are carried around in their cycle they avoid interference with the abutments.

It will be understood from the foregoing description that the terms "engine-driven" unit and "propeller" unit have been used in a relative sense, since it is apparent that either of these units may be the unit to which the power is applied, according to the conditions of use; as for instance in the application of the device to a motor vehicle with the engine cut off and the vehicle running down grade with the clutch in, power will pass through the so-called "propeller" member.

Furthermore, it will also be apparent to those skilled in the art that changes in the form, proportion and minor details of construction may be resorted to without departing from the spirit of the invention or the scope of the appended claims.

I claim:

1. A fluid clutch device including an engine driven unit, a propeller unit arranged therein and providing an oil channel, rotary abutments carried by the propeller unit and operatively connected to the engine driven unit, and a slidable control unit having means for throttling the oil channel.

2. A fluid clutch device including an engine driven unit, a propeller unit arranged therein and providing an oil channel, rotary abutments carried by the propeller unit and operatively connected to the engine driven unit, and a control unit including a plurality of slidably arranged piston-valve elements adapted to project across the oil channel.

3. A fluid clutch device including an engine driven unit consisting of a housing, a propeller unit including a shaft journaled in the housing and a body keyed to the shaft and arranged within said housing, said body cooperating with the housing to provide an oil channel, a plurality of rotatable abutments carried by the body and operatively geared to the housing, and a sliding piston-valve unit also arranged within the housing and having a plurality of piston elements adapted to be shifted transversely of the old channel.

4. A fluid clutch device including an engine driven unit including a housing consisting of a casing ring adapted to be secured to the fly wheel of a motor, a rear casing plate having guide portions projecting into the casing ring, a propeller unit including a body cooperating with the casing ring to provide an oil channel, rotatable abutments carried by the body and operatively connected with the casing ring, and a sliding control unit consisting of a carrier plate having a plurality of piston-valve elements adapted to be seated in and guided by the guide portions of the rear plate of the casing and also adapted to be projected into the oil channel.

5. A fluid clutch device including an engine driven member having interior guide members presenting an interior shoulder, a propeller member including a body having a bearing within the interior shoulder of the engine driven member and also provided with a flange of substantially the same diameter as the engine driven member thereby defining an oil channel, a plurality of rotary abutments journalled in the body of the propeller member and arranged in the said oil channel, said abutments having clearance notches, and a slidable control unit arranged within the engine driven member and consisting of a plate adapted to be shifted within the guide portion of the engine driven member, piston elements carried by said plate and slidable in the guides of the driven member, and means for operating the control unit to project the piston elements across the oil channel.

6. A fluid clutch device including an engine driven member comprising a ring and a back having a portion of less diameter than the ring, said portion having recessed guideways, and the inner edge of said portion forming one wall of an oil channel, a propeller member cooperating with the engine driven member and providing the opposite wall of the oil channel, abutments carried by the propeller member and located within the oil channel, shiftable piston elements arranged within said recessed guideways, and means for shifting said piston elements.

7. A fluid clutch device including an engine driven member comprising a ring and a back member fitted within the ring and provided with recessed guideways, and the inner edge of said back forming one wall of an oil channel, a propeller member cooperating with the back to provide the opposite wall of the channel, rotary abutments carried by the propeller and operating in the oil channel, shiftable piston elements arranged in the said recessed guideways, and means for shifting said piston elements.

8. A fluid clutch device including an engine driven member comprising a ring and a back member fitted within the ring and provided with recessed guideways, and the inner edge of said back forming one wall of an oil channel, and a propeller member including a part bearing against the inside of the ring and a part bearing within the back member, said propeller cooperating with the back member to define an oil channel, rotatable abutments carried by the propeller member and located in the oil channel, and shiftable piston elements mounted in said recessed guideways and adapted to be projected across the oil channel.

In testimony whereof I hereunto affix my signature.

JOSEPH E. FARRELL, Jr.